US012373927B2

(12) United States Patent
Esparza Garcia

(10) Patent No.: US 12,373,927 B2
(45) Date of Patent: Jul. 29, 2025

(54) METHOD FOR REDUCING IMAGE ARTIFACTS IN A DISPLAY OF THE SURROUNDING ENVIRONMENT OF A VEHICLE, COMPUTER PROGRAM, COMPUTING DEVICE, AND VEHICLE

(71) Applicant: Robert Bosch GmbH, Stuttgart (DE)

(72) Inventor: Jose Domingo Esparza Garcia, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/542,446

(22) Filed: Dec. 15, 2023

(65) Prior Publication Data
US 2024/0212112 A1 Jun. 27, 2024

(30) Foreign Application Priority Data
Dec. 22, 2022 (DE) ............. 10 2022 214 289.6

(51) Int. Cl.
*G06T 5/77* (2024.01)
*G06T 5/50* (2006.01)
(Continued)

(52) U.S. Cl.
CPC .............. *G06T 5/77* (2024.01); *G06T 5/50* (2013.01); *G06T 5/70* (2024.01); *G06T 7/0002* (2013.01);
(Continued)

(58) Field of Classification Search
CPC . G06T 2207/30252; G06T 2207/10024; G06T 5/77; G06T 5/70; G06T 5/50; G06T 5/002; G06T 5/006; G06T 7/0002
(Continued)

(56) References Cited

U.S. PATENT DOCUMENTS

2010/0259372 A1 10/2010 Hideshiro
2012/0086807 A1* 4/2012 Simon ................. G06T 5/80
348/148

(Continued)

FOREIGN PATENT DOCUMENTS

DE 102017217872 A1 4/2019
EP 3073446 B1 11/2019
WO 2018149625 A1 8/2018

*Primary Examiner* — Sherrie Hsia
(74) *Attorney, Agent, or Firm* — NORTON ROSE FULBRIGHT US LLP

(57) ABSTRACT

A method for reducing image artifacts in a display of the environment of a vehicle. The method includes: capturing at least one current camera image of the environment of the vehicle; detecting an object in the environment of the vehicle; ascertaining the position and/or movement of the object relative to the vehicle; ascertaining a movement of the vehicle; storing at least a partial area of the captured camera image as historical image data which depicts a predetermined area of the environment of the vehicle, wherein the current position relative to the vehicle is assigned to the historical image data, wherein an object area of the currently captured camera image which corresponds to the ascertained position and/or movement of the detected object is not stored as historical image data; adapting the position relative to the vehicle assigned to the stored image data depending on the ascertained movement of the vehicle.

11 Claims, 5 Drawing Sheets

(51) Int. Cl.
*G06T 5/70* (2024.01)
*G06T 7/00* (2017.01)

(52) U.S. Cl.
CPC ............... *G06T 2207/10024* (2013.01); *G06T 2207/30252* (2013.01)

(58) Field of Classification Search
USPC .................. 348/148, 143; 382/103, 104, 275
See application file for complete search history.

(56) References Cited

U.S. PATENT DOCUMENTS

2014/0347469 A1  11/2014  Zhang et al.
2023/0199137 A1* 6/2023  Ishibashi ................... B60R 1/26
                                                         348/148

* cited by examiner

METHOD FOR REDUCING IMAGE ARTIFACTS IN A DISPLAY OF THE SURROUNDING ENVIRONMENT OF A VEHICLE, COMPUTER PROGRAM, COMPUTING DEVICE, AND VEHICLE

CROSS REFERENCE

The present application claims the benefit under 35 U.S.C. § 119 of German Patent Application No. DE 10 2022 214 289.6 filed on Dec. 22, 2022, which is expressly incorporated herein by reference in its entirety.

FIELD

The present invention relates to a method for reducing image artifacts in a display of the surrounding environment of a vehicle, wherein an artifact area in a captured current camera image is ascertained depending on the ascertained position of a detected object and the captured camera image is projected onto a virtual projection surface with an adapted artifact area. The present invention also relates to a computer program comprising commands which, when the program is executed by a computer, cause the computer to carry out the steps of the method according to the present invention. The present invention furthermore relates to a computing device having a computing unit which is configured such that it carries out the steps of the method according to the present invention. The present invention also relates to a vehicle having the computing device according to the present invention.

BACKGROUND INFORMATION

PCT Patent Application No. WO 2018/149625 A1 describes a display method in which images of the surrounding environment of a vehicle are captured and parts of these images are stored. A composite overall image is then generated based on current images and the stored images.

The stretching of objects depicted in camera images and close to the camera after a coordinate transformation of the camera image and projection onto a projection surface is known and is also referred to as the Manhattan effect. Such nearby objects are often no longer recognizable to the user, at least in the projection screen display, due to the stretching. The displayed object stretching is also referred to as an artifact. To reduce such artifacts, it is conventional for example for a vertical part of the projection surface, on which an object close to the vehicle is projected, to be shifted towards the vehicle based on the distance between the vehicle and the object.

European Patent Application No. EP 3 073 446 B1 describes a method for displaying a surrounding environment of a vehicle. In the method, at least one actual camera image is captured by means of a camera arranged on the vehicle, which image represents the vehicle surrounding environment. The actual camera image is then spatially spread out in a virtual space and a preselected image area of the actual camera image in which image artifacts occur is provided in a plurality of resolutions.

A virtual camera image is then generated from the point of view of a virtual camera at a position in the virtual space, which represents the spread-out actual camera image, wherein the resolution used for the preselected image area of the actual camera image is the one, of the resolutions provided, that reduces an optical presence of image artifacts. The document discloses that the preselected image area is preselected by examining a previously generated virtual camera image for image artifacts and identifying an area associated with the image artifacts in the associated actual camera image.

An object of the present invention is to reduce image artifacts in a displayed view of an surrounding environment of a vehicle in an improved manner, in particular for image artifacts caused by dynamic objects or objects in proper motion.

SUMMARY

The above object may be achieved according to features of the present invention.

The present invention relates to a method for reducing image artifacts in a display of the surrounding environment of a vehicle. According to an example embodiment of the present invention, the method comprises capturing at least one current camera image of the surrounding environment of the vehicle, in particular by means of at least one vehicle camera, advantageously by means of at least one wide-angle camera of the vehicle. Preferably, a plurality of vehicle cameras can be arranged on the vehicle for capturing current camera images, for example four wide-angle cameras. In a further method step, an object is detected in the surrounding environment of the vehicle, in particular a dynamic object. The detection of the object is preferably carried out depending on distance data which are acquired or ascertained in particular by means of at least one additional distance sensor; for example, an object is detected when a distance threshold value is undershot.

Alternatively or additionally, the object is recognized in particular depending on the captured current camera image and/or based on stored historical image data, for example if a large difference is ascertained in the current camera image compared to the stored historical image data. In the detection of the object, it is not crucial that the detected object be precisely identified in terms of its kind or type; but rather that simply detecting the presence of a dynamic object is crucial. The object is detected in particular by a trained machine detection method, in particular a neural network. The position and optionally the movement of the object relative to the vehicle are then ascertained, in particular depending on the captured current camera image and/or the stored historical image data. In a further process step, a movement or proper movement of the vehicle is captured or ascertained. The movement of the vehicle is preferably ascertained depending on an optical flow ascertained on the basis of the captured camera image and/or depending on an ascertained position of the vehicle, which is determined for example by means of a satellite-based navigation system, and/or depending on an acquired steering angle, which is acquired for example by means of a steering angle sensor and/or a yaw sensor. Alternatively or additionally, the ascertaining of the movement of the vehicle is captured or ascertained depending on an ascertained speed of the vehicle, which is ascertained for example by means of a speed sensor, and/or depending on a rotational speed of the wheels acquired by means of a rotational speed sensor, and/or depending on an acceleration of the vehicle acquired by means of an acceleration sensor, and/or depending on a control parameter for the drive motor of the vehicle.

Furthermore, in another method step, at least a partial area of the captured camera image is stored as historical image data.

The partial area of the captured camera image forms a predefined area of the environment around the vehicle. The current position in each case relative to the vehicle is assigned to the historical image data, in particular by means of a coordinate transformation of the captured camera image, which is advantageously based on the known arrangement position and orientation of the vehicle camera and/or a calibration of the at least one vehicle camera. An object area of the currently captured camera image, which represents the ascertained position and/or the ascertained movement of the detected object, is not stored as historical image information, in particular if the ascertained position and/or the future position of the detected object determined on the basis of the ascertained movement has a distance relative to the vehicle that is less than or equal to a distance threshold value. In other words, the stored historical image data, whose associated position can be assigned to the ascertained position and/or the ascertained movement of the detected object, is not updated by the captured current camera image. The position assigned to the stored image data is then adapted or updated relative to the vehicle depending on the ascertained movement of the vehicle. In other words, the associated position of the stored historical image data relative to the vehicle is corrected or adapted based on the captured or ascertained movement of the vehicle. This means, for example, that historical image data are available from the vehicle's journey that depict an area of the surrounding environment below the vehicle that is currently no longer captured by any camera image. As a result, historical image data with an assigned position are advantageously also available that represent the area of the environment at the ascertained position of the captured object, wherein the historical image data at the corresponding assigned position do not contain the dynamic object. In a further method step, an artifact area in the at least one captured current camera image is ascertained depending on the ascertained position of the detected object, wherein the artifact area depicts at least the detected object as an image artifact. The ascertained artifact area advantageously does not correspond to the object area of the captured camera image. The artifact area is advantageously smaller than the object area.

The ascertained artifact area is then adapted, wherein the image data of the captured camera image are replaced by those stored historical image data whose assigned position represents the artifact area. Finally, the user is shown an environment view of the vehicle's surrounding environment, wherein the captured current camera image with the adapted artifact area is projected onto a virtual projection surface. The method has the technical advantage that image artifacts based on dynamic objects in the displayed environment view are reduced or prevented with the virtual projection surface, where the image artifacts would result from their stretching after the coordinate transformation. The advantage results in particular when these image artifacts are caused by dynamic objects with a position in the close region around the vehicle and/or with an actual or predicted movement of the dynamic object in the close region. As a result, the user advantageously receives a faster or simpler understanding of the guidance of the vehicle, since false information or artifacts are reduced.

In a preferred embodiment of the present invention, in an additional step distance data between the vehicle and objects in the surrounding environment of the vehicle are acquired or ascertained. The acquisition takes place in particular by means of at least one additional distance sensor, for example an ultrasonic sensor, radar sensor, and/or lidar sensor.

Alternatively or additionally, the distance data can, for example, be determined by means of the vehicle camera using a "structure from motion" method, or acquired by an additional stereo camera. The object in the close region of the vehicle is then detected depending on the acquired or ascertained distance data. Alternatively or additionally, ascertaining the position of the object relative to the vehicle is carried out depending on the acquired distance data. This design results in the advantage that a nearby object is reliably detected even if the object is particularly close to the vehicle, for example if it obscures the field of vision of the vehicle camera, or if it can no longer be recognized as such by a trained machine recognition method due to being only partially depicted in the captured camera image.

In one example embodiment of the present invention, a change in brightness and/or in at least one color value is additionally carried out in the adapted artifact area of the captured current camera image. For example, the historical image data in the artifact area in this embodiment can be adapted into gray values and/or the brightness of the pixels of the historical image data can be displayed in a reduced manner in the artifact area. As a result, the user is shown in a readily understood manner that this area or artifact area in the displayed environment view has been adapted or is not being represented by a captured current camera image, but by historical image data.

In another embodiment of the present invention, a frame is inserted around the adapted artifact area of the captured current camera image. This also indicates to the user that this area has been adapted in the displayed environment view or is being represented not by a captured current camera image but by historical image information.

In a further embodiment of the present invention, it may be provided that the adapted artifact area of the captured current camera image is softened, and/or blurring is generated in the adapted artifact area. This embodiment allows the user to easily recognize which displayed areas of the displayed environment view are based on historical image information or do not represent a currently captured camera image.

In a development of the present invention, a stored item of image information and/or a synthetic object model is provided or loaded from an electronic memory depending on the detected object, wherein the stored image information and/or the synthetic object model represent the detected object or an indication of the adaptation of the artifact area. The provided image information and/or the synthetic object model are then inserted at the virtual position on the virtual projection surface, which represents the ascertained position of the detected object.

The present invention also relates to a computer program comprising commands which, when the program is executed by a computer, cause the computer to carry out the steps of the method according to the present invention.

The present invention further relates to a computing device, in particular a control device, a decentralized computing device, or a centralized computing device. The computing device comprises at least one first signal input for providing a first input signal which represents at least one current camera image of the vehicle surrounding environment captured by a vehicle camera. The computing device also has a signal output for outputting an output signal for a display device, wherein the output signal represents at least one view of the captured camera image with an adapted artifact area on a virtual projection surface. The computing device further comprises a computing unit, in particular a processor, which is configured such that it executes the steps of a method according to the present invention.

In an advantageous development of the present invention, the computing device comprises a second signal input for providing a second input signal which represents acquired distance data, acquired by means of a distance sensor, between the vehicle and at least one object in the surrounding environment of the vehicle.

The present invention also relates to a vehicle comprising at least one vehicle camera, wherein the vehicle camera in particular comprises a wide-angle lens. The vehicle can have an optional distance sensor. The vehicle further comprises a computing device according to the present invention.

Further advantages can be found in the following description of exemplary embodiments with reference to the figures.

DETAILED DESCRIPTION OF EXAMPLE EMBODIMENTS

Figure 1:
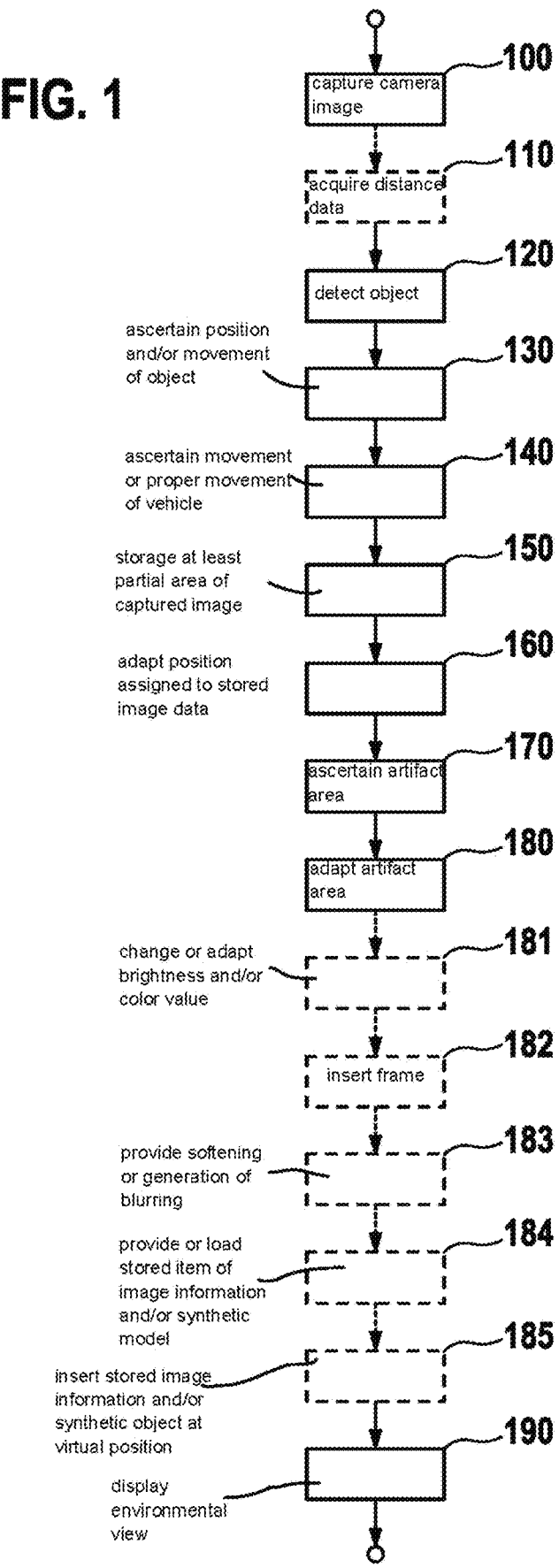
FIG. 1 shows a flowchart of the method as a block diagram, according to an example embodiment of the present invention.

FIG. 1 schematically shows a flowchart of a method according to an example embodiment of the present invention as a block diagram. In a method step 100, at least one current camera image of the surrounding environment of the vehicle is captured. The capture 100 is effected in particular by means of at least one wide-angle camera. Optionally, an acquisition 110 can be provided of distance data between the vehicle and objects in the surrounding environment of the vehicle, in particular by means of at least one additional distance sensor, for example an ultrasonic sensor, radar sensor, and/or lidar sensor. In a further method step 120, an object is detected in the surrounding environment of the vehicle, wherein the object is in particular dynamically moving or in proper movement. For example, the detected object is a person or a cyclist or another vehicle or non-ego vehicle. It can be provided that the type of the detected object is unknown and only the presence of an object is detected. The detection 120 of the object is advantageously carried out by a trained machine detection method depending on the captured current camera image and/or based on acquired distance data. In a further method step 130, the position of the object relative to the vehicle and/or the movement of the object relative to the vehicle are ascertained.

The ascertainment 130 of the position of the object relative to the vehicle advantageously takes place depending on the acquired distance data. In addition, in method step 140, a movement or proper movement of the vehicle is ascertained. The ascertainment 140 of the movement of the vehicle advantageously takes place based on a captured steering angle of the vehicle and/or on the basis of a captured speed. In method step 150, at least a partial area of the captured camera image is stored as historical image data, with the pixel positions of the captured current camera image being modified for storage, in particular by a coordinate transformation; for example, a rectification and a perspective change of the captured current camera image is carried out. In other words, historical image data in particular are generated in step 150. The object area of the currently captured camera image, which corresponds to the ascertained position and/or the ascertained movement of the detected object, is not saved as historical image data. The stored partial area represents a predefined area of the environment of the vehicle, wherein the predefined area of the environment represents in particular a horizontal area of the environment around the vehicle and is limited by a limit distance threshold value. The current position relative to the vehicle is assigned to the historical image data. In a further step 160, the position assigned to the stored image data is adapted relative to the vehicle depending on the ascertained movement of the vehicle.

Subsequently, in step 170 an artifact area in the at least one captured current camera image is ascertained depending on the ascertained position of the detected object, wherein the artifact area depicts at least the detected object as an image artifact, wherein the artifact area is limited in particular by a contour of the object. An adaptation 180 of the artifact area takes place next, wherein the image data of the captured camera image are replaced in the artifact area by those stored historical image data whose associated position represents the artifact area. In the optional step 181, it can be provided to change or adapt the brightness and/or at least one color value in the adapted artifact area of the captured current camera image. Furthermore, in the optional step 182, a frame can be inserted around the adapted artifact area of the captured current camera image; for example, the inserted frame runs along the boundary of the ascertained artifact area. In a further optional step 183, a softening or the generation of a blurring can be provided in the adapted artifact area of the captured current camera image. In addition, in the optional step 184 a stored item of image information and/or a synthetic object model can be provided or loaded depending on the detected object, wherein the stored image information and/or the loaded synthetic object model represent the detected object or an indication of the adaptation of the artifact area. In a further optional step 185, this stored image information and/or the synthetic object model is inserted at the virtual position on the virtual projection surface that represents the ascertained position of the detected object. Finally, in step 190, an environment view of the environment of the vehicle is displayed for the user by projecting the captured camera image with the adapted artifact area onto a virtual projection surface, in particular by means of a display device.

Figure 2:
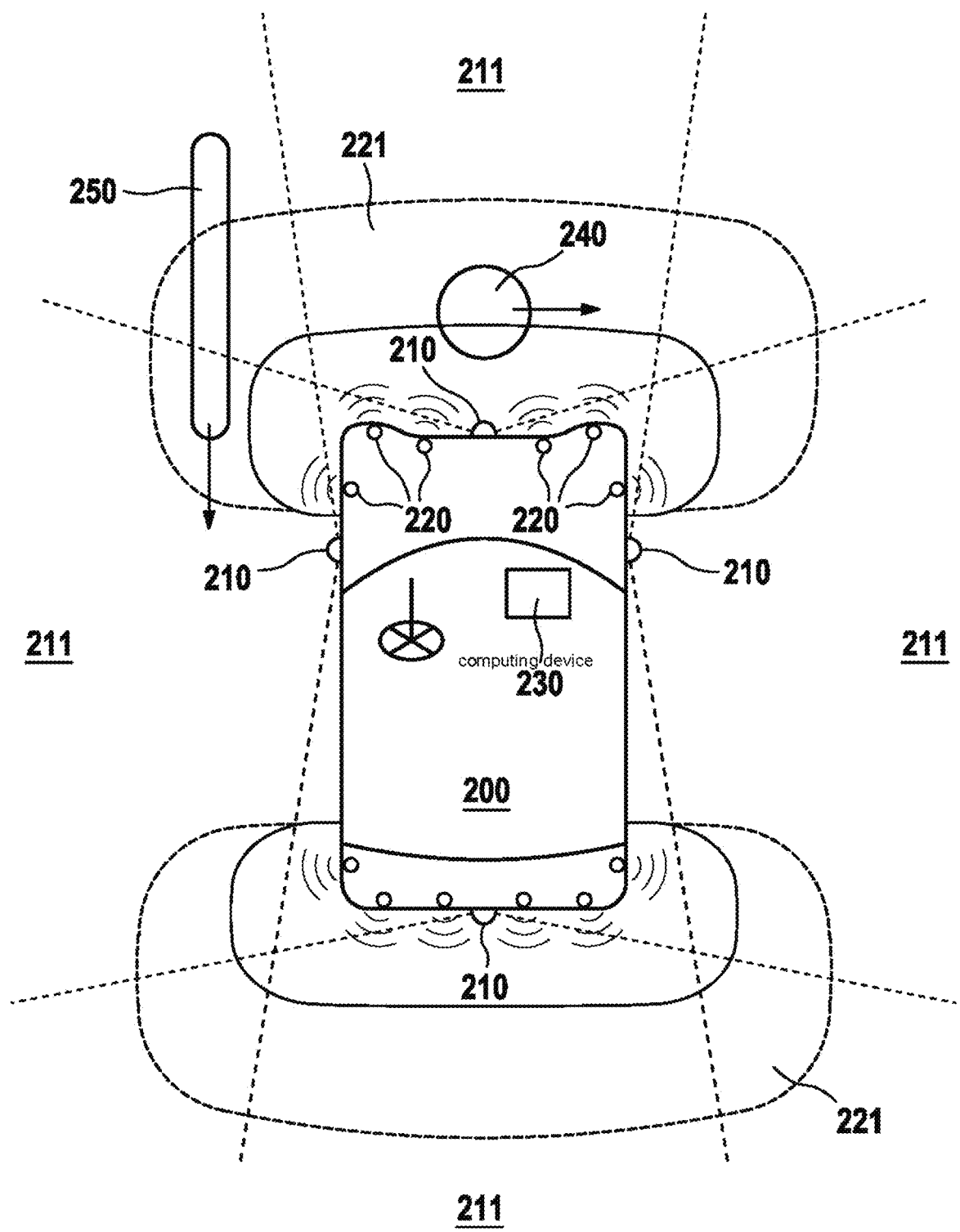
FIG. 2 shows a vehicle.

FIG. 2 schematically shows a vehicle 200 from above in plan view. In this exemplary embodiment, the vehicle 200 comprises four wide-angle cameras as vehicle cameras 210 and twelve ultrasonic sensors as distance sensors 220. The vehicle cameras 210 and the distance sensors 220 each capture different areas of the environment 290 of the vehicle 200 and are each connected to the computing device 230 by means of a cable. The vehicle cameras 210 are each configured to capture a camera image from an area of the environment 211, wherein in each case two captured areas of the environment 211 overlap at the corners of the vehicle 200. The distance sensors 220 are set up to acquire distance data in the capture areas 221 which represent distances between the vehicle 200 and objects 240, 250 in the environment 290 of the vehicle 200. The computing device 230 is advantageously set up to generate an environment view based on the captured current camera images, stored image data, and the acquired distance data, wherein the environment view in particular comprises a virtual projection surface onto which the captured current camera images and the stored image data are projected. The projection surface is preferably adapted depending on the acquired distance data, in particular shifted toward the vehicle in the environment view or in the environment model when a static object is detected in the immediate vicinity of the vehicle. A first dynamic object 240, for example a person, is present in the environment in front of the vehicle 200. A further second dynamic object 250 is located laterally alongside the vehicle 200, and for example is a bicycle. The directions of movement of the dynamic objects 240, 250 are indicated schematically by arrows in FIG. 2.

Figure 3:
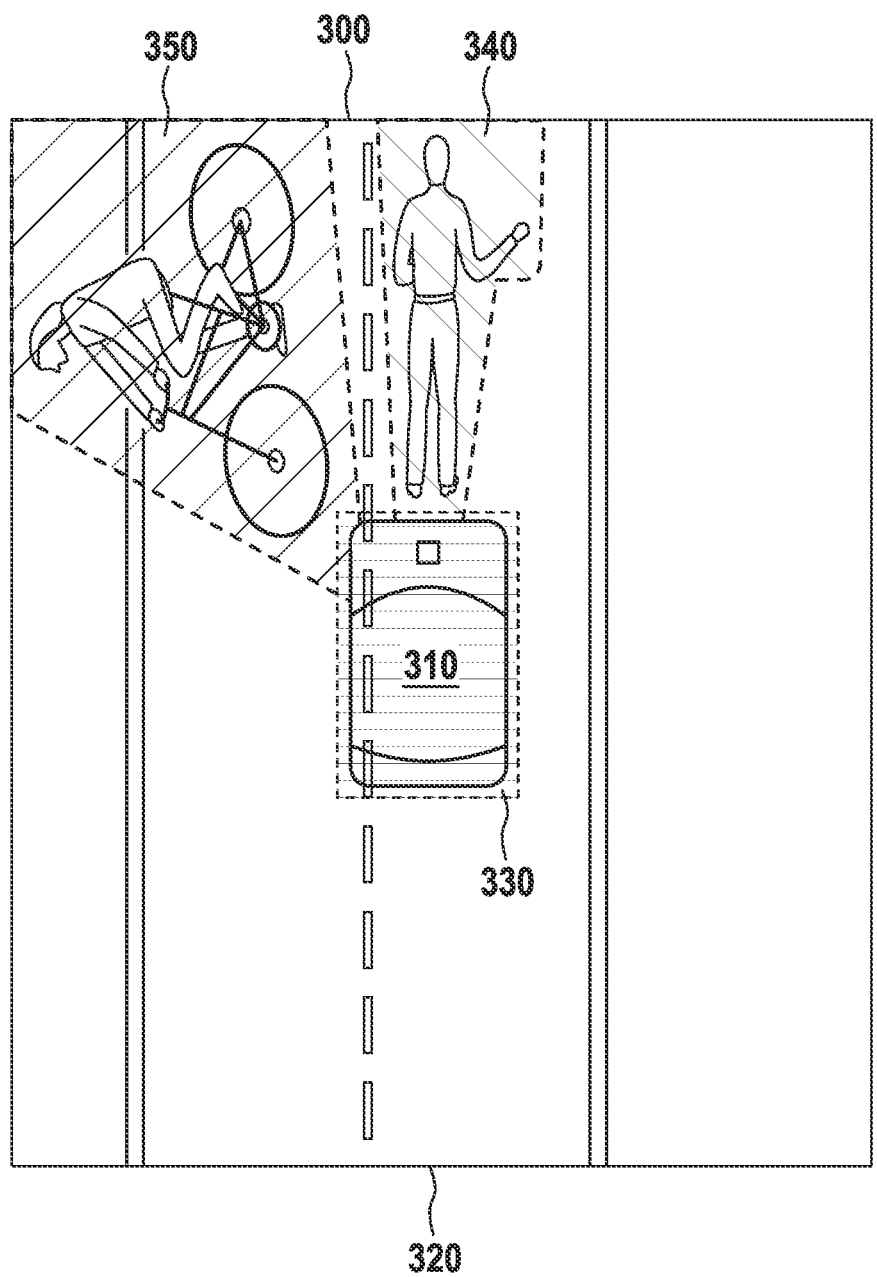
FIG. 3 shows an environment view with artifact.

In FIG. 3, a virtual environment view 300 of the environment 290 of the vehicle 200 is shown schematically from a virtual perspective from above vertically downwards and corresponding to the situation in FIG. 2; this type of displayed environment view 300 is also referred to as a top-down view or a bird's eye view. A semi-transparent vehicle model 310 is shown in the center of the environment view 300 or of the environment model, and below it the underbody area 330 of the vehicle model 310 is shown cross-hatched in FIG. 3. Stored historical image data are projected onto the underbody area 330 of the projection surface 320. The historical image data were acquired at an earlier point in time by one of the vehicle cameras 210. In an artifact area 340 of the projection surface 320 shown cross-hatched in FIG. 3, the first dynamic object 240 close to the vehicle 200 is shown in front of the vehicle. As a result of the coordinate transformation to rectify the wide-angle image and to adapt the imaging perspective, in the environment view the dynamic object 240 is depicted in the artifact area 340 in a highly compressed manner, such that it can hardly be recognized by the user. In a further artifact area 350 of the projection surface 320 shown hatched in FIG. 3, the second dynamic object 250 close to the vehicle 200 is depicted in front of the vehicle 200. Due to its proximity to the vehicle camera, it is also shown very stretched. This stretching of nearby objects, as shown in FIG. 3, is also known as the "Manhattan" effect. In the case of a plurality of nearby objects, the environment view can no longer be meaningfully displayed, since the artifact areas distort the view in a manner remote from reality.

Figure 4:
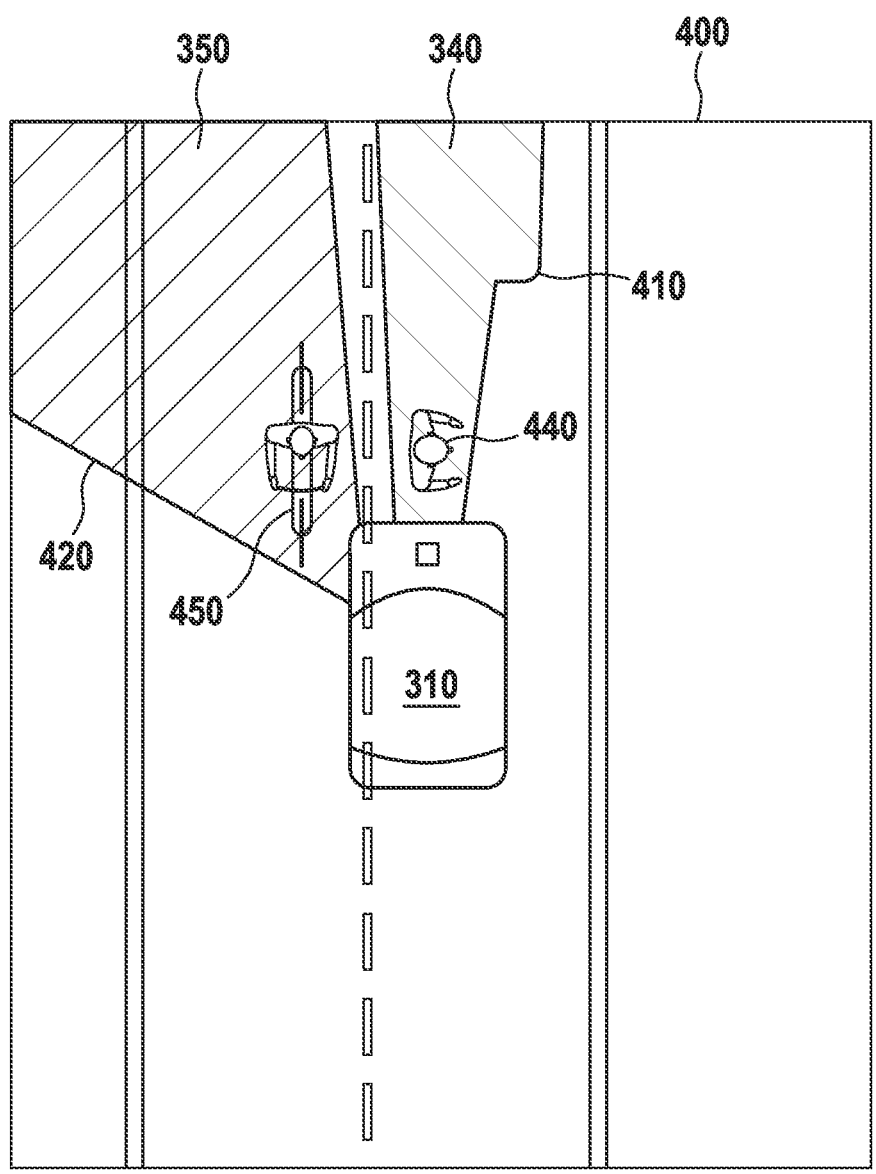
FIG. 4 shows an environment view with adapted artifact area.

In FIG. 4, the environment view relating to the exemplary embodiment in FIG. 3 is schematically shown with an adapted artifact area. In the artifact areas 340 and 350 of the captured current camera image, shown cross-hatched in FIG. 4, the image information has been replaced by stored historical image data, so that now no object is shown as an artifact in these artifact areas 340 and 350. In order nonetheless to make the presence of an object recognizable for the user or driver, an item of image information or a synthetic object model 440 for a person and an item of image information or a synthetic object model 450 for a bicycle has been inserted onto the projection surface. In addition, the adapted artifact areas 340 and 350 are identified by way of example for the user by a frame 410 and 420, respectively. It is therefore clear to the user that in these areas 340 and 350 historical image data have been used to depict the environment. In this exemplary embodiment, the dimensions of the predetermined area of the environment for storing the historical image data correspond to the dimensions of the environment view.

Figure 5:
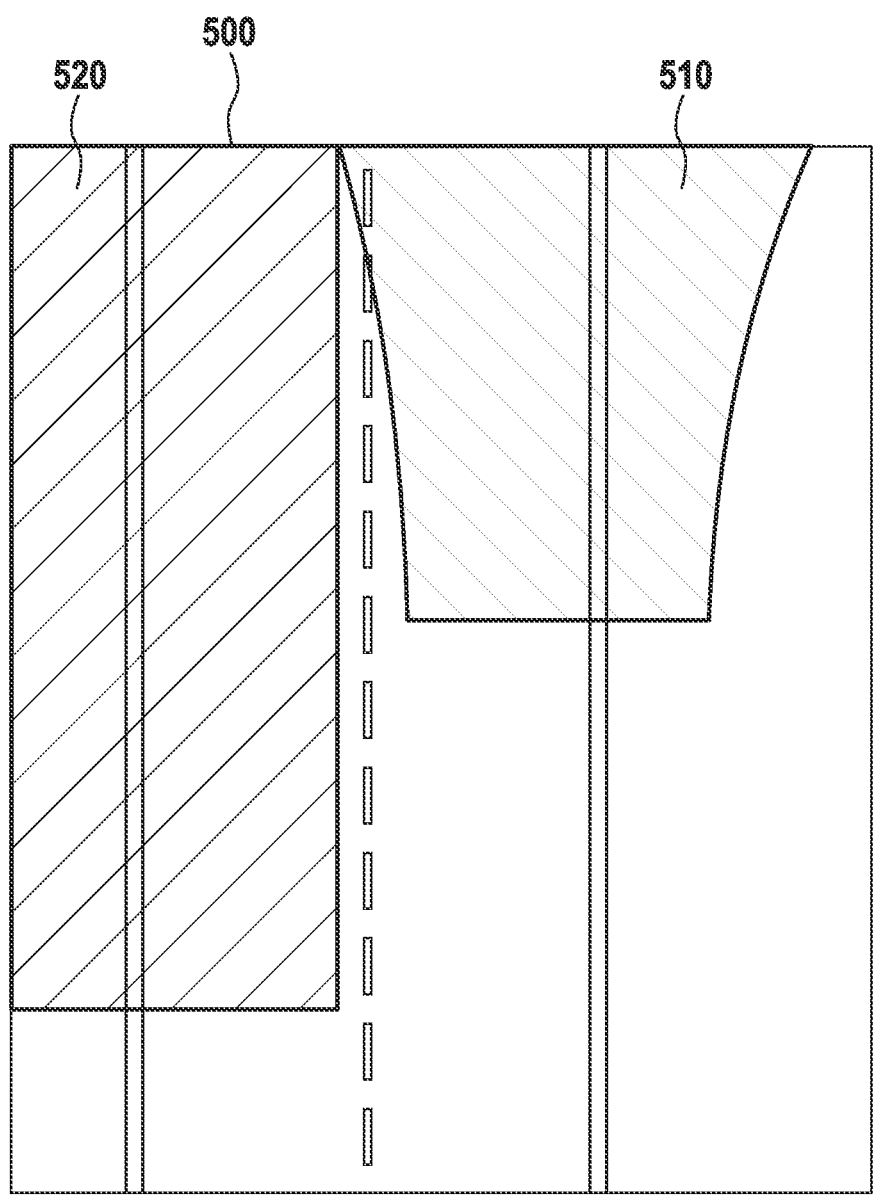
FIG. 5 shows a stored image data of the predefined area of the environment

FIG. 5 schematically shows stored image data in the predetermined area of the environment 500, corresponding to the representation in FIG. 4. The position of the stored historical image data is continuously adapted to the movement of the vehicle, wherein the historical image data are partly replaced by captured current camera images, and partly deleted.

For other historical image data, only the assigned position is adapted on the basis of the ascertained movement of the vehicle.

As a result, historical image data stored for the underbody area 330 can also be made available. The object area 510 represents the area of the environment of the vehicle 200 in which the ascertained position of the person as a dynamic object 240 and a predicted movement of the object 240, and the resulting presumed artifact formation, are located. In this object area 510, the stored image data are temporarily not overwritten or updated by captured current camera images; but rather only the position assigned to the historical image data are adapted on the basis of the movement of the vehicle. The object area 520 represents the area of the environment of the vehicle 200, in which the ascertained position of the bicycle as a dynamic object 250 and a predicted movement of the object 250, as well as the resulting presumed artifact formation, are located. In this object area 520, the stored image data are temporarily not overwritten or updated by captured current camera images; but rather only the position assigned to the historical image data is adapted on the basis of the movement of the vehicle.

What is claimed is:

1. A method for reducing image artifacts in a display of an environment of a vehicle, comprising the following steps:
capturing at least one current camera image of the environment of the vehicle;
detecting an object in the environment of the vehicle, the object being a dynamic object;
ascertaining a position and/or a movement of the object relative to the vehicle including a direction of movement and a speed of movement;
ascertaining a movement of the vehicle;
storing at least a partial area of the captured current camera image as historical image data which depicts a predetermined area of the environment of the vehicle, wherein a current position relative to the vehicle is assigned to the historical image data, wherein an object area of the captured current camera image which corresponds to the ascertained position and/or the ascertained movement of the detected object is not stored as historical image data;
adapting the position relative to the vehicle assigned to the stored image data depending on the ascertained movement of the vehicle;
ascertaining an artifact area in the captured current camera image depending on the ascertained position of the detected object, wherein the artifact area depicts at least the detected object as an image artifact;
adapting the artifact area, wherein image data of the captured current camera image in the artifact area are replaced by those stored historical image data whose assigned position represents the artifact area; and
displaying an environment view of the surrounding environment of the vehicle by projecting the captured current camera image with the adapted artifact area onto a virtual projection surface.

2. The method according to claim 1, further comprising:
acquiring distance data between the vehicle and objects in the surrounding environment of the vehicle using at least one additional distance sensor including an ultrasonic sensor and/or a radar sensor and/or a lidar sensor;
wherein:

the detection of the object takes place depending on the acquired distance data, and/or the ascertaining of the position of the object relative to the vehicle takes place depending on the acquired distance data.

3. The method according to claim 1, further comprising:
changing a brightness and/or at least one color value in the adapted artifact area of the captured current camera image.

4. The method according to claim 1, further comprising:
inserting a frame around the adapted artifact area of the captured current camera image.

5. The method according to claim 1, further comprising:
softening the adapted artifact area of the captured current camera image.

6. The method according to claim 1, further comprising:
providing an item of stored image information and/or a synthetic object model depending on the detected object, wherein the stored image information and/or the synthetic object model represent the detected object or an indication of the adaptation of the artifact area, and
inserting the stored image information and/or the synthetic object model at the virtual position on the virtual projection surface which represents the ascertained position of the detected object.

7. A non-transitory computer-readable medium on which is stored a computer program including commands for reducing image artifacts in a display of an environment of a vehicle, the commands, when executed by a computer, causing the computer to perform the following steps:
capturing at least one current camera image of the environment of the vehicle;
detecting an object in the environment of the vehicle, the object being a dynamic object;
ascertaining a position and/or a movement of the object relative to the vehicle including a direction of movement and a speed of movement;
ascertaining a movement of the vehicle;
storing at least a partial area of the captured current camera image as historical image data which depicts a predetermined area of the environment of the vehicle, wherein a current position relative to the vehicle is assigned to the historical image data, wherein an object area of the captured current camera image which corresponds to the ascertained position and/or the ascertained movement of the detected object is not stored as historical image data;
adapting the position relative to the vehicle assigned to the stored image data depending on the ascertained movement of the vehicle;
ascertaining an artifact area in the captured current camera image depending on the ascertained position of the detected object, wherein the artifact area depicts at least the detected object as an image artifact;
adapting the artifact area, wherein image data of the captured current camera image in the artifact area are replaced by those stored historical image data whose assigned position represents the artifact area; and
displaying an environment view of the surrounding environment of the vehicle by projecting the captured current camera image with the adapted artifact area onto a virtual projection surface.

8. A computing device including a control device or a decentralized computing device or a centralized computing device, comprising:
a first signal input configured to provide a first input signal which represents at least one current camera image of an environment of the vehicle captured using a vehicle camera, wherein the vehicle camera includes a wide-angle lens;
a processor configured to reduce image artifacts in a display of the environment of a vehicle, the processor configured to:
detect an object in the environment of the vehicle, the object being a dynamic object,
ascertain a position and/or a movement of the object relative to the vehicle including a direction of movement and a speed of movement,
ascertain a movement of the vehicle,
store at least a partial area of the captured current camera image as historical image data which depicts a predetermined area of the environment of the vehicle, wherein a current position relative to the vehicle is assigned to the historical image data, wherein an object area of the captured current camera image which corresponds to the ascertained position and/or the ascertained movement of the detected object is not stored as historical image data,
adapt the position relative to the vehicle assigned to the stored image data depending on the ascertained movement of the vehicle,
ascertain an artifact area in the captured current camera image depending on the ascertained position of the detected object, wherein the artifact area depicts at least the detected object as an image artifact, and
adapt the artifact area, wherein image data of the captured current camera image in the artifact area are replaced by those stored historical image data whose assigned position represents the artifact area; and
a signal output configured to output an output signal for a display device, the output signal representing at least one view of the captured current camera image with the adapted artifact area on a virtual projection surface.

9. The computing device according to claim 8, further comprising:
a second signal input configure to provide a second input signal which represents distance data between the vehicle and the object in the surrounding environment of the vehicle acquired using a distance sensor.

10. A vehicle, comprising:
at least one vehicle camera; and
a computing device including a control device or a decentralized computing device or a centralized computing device, including:
a first signal input configured to provide a first input signal which represents at least one current camera image of an environment of the vehicle captured using a vehicle camera, wherein the vehicle camera includes a wide-angle lens;
a processor configured to reduce image artifacts in a display of the environment of a vehicle, the processor configured to:
detect an object in the environment of the vehicle, the object being a dynamic object,
ascertain a position and/or a movement of the object relative to the vehicle including a direction of movement and a speed of movement, ascertain a movement of the vehicle,
store at least a partial area of the captured current camera image as historical image data which depicts a predetermined area of the environment of the vehicle, wherein a current position relative to the vehicle is assigned to the historical image data, wherein an object area of the captured current camera image which corresponds to the ascertained position and/or the ascertained movement of the detected object is not stored as historical image data, adapt the position relative to the vehicle assigned to the stored image data depending on the ascertained movement of the vehicle, ascertain an artifact area in the captured current camera image depending on the ascertained position of the detected object, wherein the artifact area depicts at least the detected object as an image artifact, and adapt the artifact area, wherein image data of the captured current camera image in the artifact area are replaced by those stored historical image data whose assigned position represents the artifact area; and a signal output configured to output an output signal for a display device, the output signal representing at least one view of the captured current camera image with the adapted artifact area on a virtual projection surface.

11. The vehicle according to claim 10, further comprising a distance sensor.

* * * * *